Patented July 11, 1939

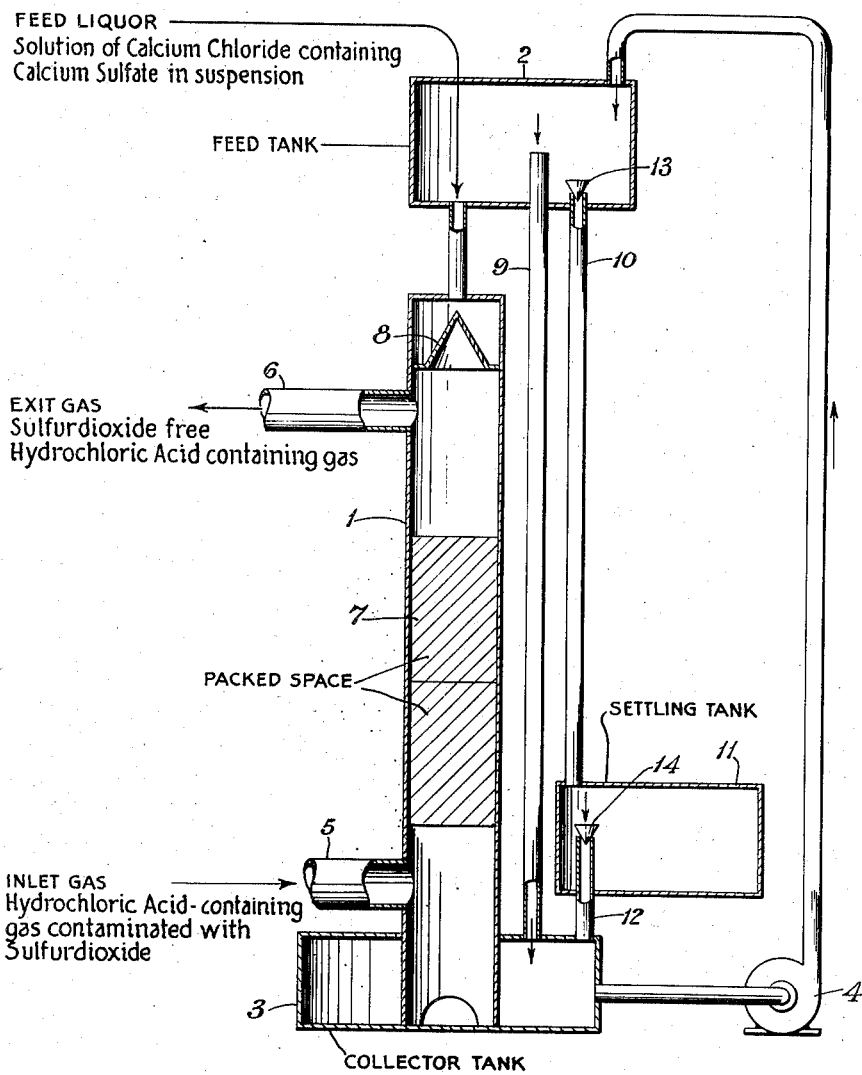

2,165,784

UNITED STATES PATENT OFFICE 2,165,784

TREATMENT OF ACID GASES

Leslie James Burrage, Liverpool, England, assignor to Imperial Chemical Industries Limited, a corporation of Great Britain Application February 12, 1937, Serial No. 125,515
In Great Britain February 14, 1936

5 Claims. (Cl. 23—154)

This invention relates to an improved method for the treatment of acid gases, and more particularly to the removal of sulfur compounds from acid gases.

In the chemical industry it is a well known method to prepare a volatile acid gas by the reaction of sulfuric acid on an appropriate salt. A common example of this is the preparation of hydrochloric acid by the action of sulfuric acid on sodium chloride. Gaseous acids prepared in this manner are frequently contaminated by sulfur compounds derived from the sulfuric acid used in the process. Thus sulfur dioxide and sulfuric acid mist may be present. Sulfuric acid in the form of mist may be largely removed by high speed scrubbing devices, but difficulty is experienced in eliminating sulfur dioxide. Various proposals have been made for removing impurities such as sulfur dioxide from spent combustion gases and the like by treating them with alkaline liquids, e. g. aqueous suspensions of lime. Such methods are, however, obviously unsuitable for the treatment of hydrochloric acid or similar gases.

This invention has as an object to devise a method of removing sulfur compounds from acid gases. A further object is to devise a method of removing sulfur compounds from hydrochloric acid gas. A further object is to devise a method of removing sulfur dioxide from hydrochloric acid gas. Further objects will appear hereafter.

These objects are accomplished by the following invention. I have found that I can remove sulfur compounds from acid-containing gases by contacting the gases in the presence of oxygen with a solution of the acid containing a salt of a metal which will form a sulfate insoluble under the working conditions, and in the presence of the insoluble sulfate or a catalyst adapted to oxidise sulfites into sulfates. Thus I remove sulfur compounds from a hydrochloric acid containing gas by contacting the gas with an aqueous solution of hydrochloric acid and a soluble calcium salt having calcium sulfate which is not necessarily anhydrous suspended therein. It will, of course, be understood that for the invention to be effective for industrial purposes the soluble calcium salt in the aqueous solution has to be selected to avoid contamination of the acid in the gas. Thus the calcium salt should not be one which is attacked by the acid yielding a volatile compound. I therefore find it preferable to use calcium chloride.

In the accompanying drawing I provide a flow sheet illustrating one method of carrying out my invention. The flow sheet also illustrates diagrammatically suitable apparatus for carrying out this method. As illustrated, this apparatus may include a packed tower 1, a feed tank 2, a collector tank 3, and a circulating pump 4 arranged to form a circulating system whereby feed liquor from the feed tank 2 passes down thru the tower into the collector tank 3 and is returned to the feed tank 2 and so on. The packed tower may be of any conventional design and as illustrated includes a gas inlet 5, a gas outlet 6, a suitable packed space 7, and means 8 for distributing the feed liquor over the surface of the packing material. Thus the feed liquor, which is a solution of calcium chloride or other soluble calcium salt containing calcium sulfate in suspension, passes down the packed tower in countercurrent flow to an ascending current of gas. Alternatively gas and liquid flow can be co-current, and in either case an unpacked tower might be used altho a packed tower is preferred. Recirculation of the feed liquor as illustrated is desirable because the feed liquor may be used repeatedly before it loses its power of removing sulfur dioxide from the contaminated gases.

While the feed tank 2 may be omitted if desired and the liquid pumped directly to the top of the tower, it is desirable to have a device which permits a constant head of feed liquor above the tower to be set up and yet keeps the solid matter suspended in the solution, and I find that this can be accomplished in a convenient manner by providing the feed tank 2 with an overflow pipe 9 leading to the collector tank 3. By pumping the liquid up to the feed tank at such a rate that some is always overflowing a steady head of liquid is maintained and the solid matter is kept in suspension by the agitation of the liquid caused by the pumping.

With repeated use of the liquid the amount of solid material increases at the expense of the soluble calcium salt and may become inconveniently great. It is thus desirable to provide means for separating part of the suspended material from the liquid at intervals, determined largely by the amount of sulfur dioxide removed from the gases. To this end the feed tank 2 is provided with an outlet pipe 10 leading to a settling tank 11 which in turn communicates with the collector tank by means of the overflow pipe 12. By suitable manipulation of the valves 13 and 14 the feed liquor may be periodically diverted to the settling tank where suspended matter is allowed to settle out and the supernatant liquor then returned to the circulating system. The soluble calcium salt transformed to insoluble material has also to be made good, and this may be done in any convenient manner, e. g. by periodically adding the necessary amount of salt to the tanks, or by allowing a slow stream of a solution of the salt to flow into the circulating liquid. Another convenient method is to add from time to time calcium oxide or hydroxide, which then dissolves in the acid to replenish the salt.

The following example illustrates but does not limit the invention.

*Example.*—Gases containing about 7% HCl and 0.08% $SO_2$, the remainder being air, were treated continuously in a ring packed tower with a solution containing 28% HCl, 15% calcium chloride and having in suspension about 1% of finely divided calcium sulfate. The gases were passed up the tower from the bottom countercurrent to the purifying solution which was continuously circulated by means of a pump. The exit gases from the tower contained 0.01% $SO_2$.

Preferably, a solution is used which contains initially enough acid to be in equilibrium with the acid in the gas stream, so that the concentration of the latter is not affected by the treatment. It will, however, be evident that if the process is worked in a continuous manner to treat a stream of gas of constant composition, such a concentration of solution will inevitably be attained ultimately.

Considerable variation in the content of the soluble calcium salt is possible without adversely affecting the efficiency of the process; thus in the treatment of hydrochloric acid gases, calcium chloride is effective at a concentration of 1%; on the other hand, concentrations as high as 20–30% can be used satisfactorily.

Similarly, varying amounts of suspended calcium sulfate may be present in the initial liquid, and I find that amounts of from 0.5 to 1.5% are suitable, e. g. 1%.

Altho the invention is applicable to the treatment of any gases containing hydrogen chloride contaminated with sulfur dioxide, it is more especially valuable in the treatment of gases produced in the operation of saltcake furnaces and the like, and in such cases, I find that one treatment according to my invention usually suffices to reduce the sulfur dioxide content to a satisfactory figure. However, if desired, the gases may be passed thru several towers in succession, fresh solutions being used in each tower, alternatively the same solution may be passed thru each tower in succession in opposite order to that in which the gas circulates thru them.

Altho I have illustrated the invention with the separation of sulfur compounds from hydrochloric acid gas it is obvious to anyone skilled in the art that it can be applied to the separation of sulfur compounds from other acid gases such as $CO_2$, HBr, and the remaining halogen acid gases. Moreover instead of using calcium chloride and converting it into calcium sulfate any metal salt, such as salts of barium, and lead, in which the sulfate is less soluble than the original salt, and less soluble than the salt formed by the acid which is being purified, could be used.

As many apparently widely different embodiments of this invention may be made without departing from the spirit and scope thereof, it is to be understood that I do not limit myself to the specific embodiments thereof except as defined in the appended claims.

I claim:

1. A process for obtaining hydrochloric acid-containing gas substantially free of sulfur dioxide which comprises treating hydrochloric acid-containing gas contaminated with sulfur compounds in the presence of oxygen with an aqueous medium containing in solution a soluble calcium salt and hydrochloric acid, and in suspension calcium sulfate, under conditions such that the partial pressure of sulfur dioxide in the gas is greater than the vapor pressure of sulfur dioxide in the aqueous medium.

2. The process of claim 1 in which the aqueous medium is unsaturated with respect to the calcium salt and saturated with respect to hydrochloric acid.

3. The process of claim 1 in which the calcium salt is calcium chloride.

4. A process for obtaining hydrochloric acid-containing gas substantially free of sulfur dioxide which comprises passing hydrochloric acid gas contaminated with sulfur compounds in admixture with oxygen thru a packed tower countercurrent to a descending stream of an aqueous medium containing in solution calcium chloride and hydrochloric acid, and in suspension calcium sulfate, under conditions such that the partial pressure of sulfur dioxide in the gas is greater than the vapor pressure of sulfur dioxide in the aqueous medium.

5. The process of claim 4 in which the aqueous medium is recirculated thru the tower in a manner such that the aqueous medium is maintained in a state of agitation sufficient to keep the calcium sulfate in suspension.

LESLIE JAMES BURRAGE.